(12) United States Patent
Medford et al.

(10) Patent No.: US 7,197,077 B2
(45) Date of Patent: Mar. 27, 2007

(54) MULTILEVEL DATA COMPRESSION USING A SINGLE COMPRESSION ENGINE

(75) Inventors: Brad Allen Medford, Austin, TX (US); Ahmad Ansari, Austin, TX (US); Pierre Costa, Austin, TX (US); John Robert Erickson, Austin, TX (US)

(73) Assignee: SBC Technologies Resources, Inc., Austin, TX (US)

( * ) Notice: Subject to any disclaimer, the term of this patent is extended or adjusted under 35 U.S.C. 154(b) by 629 days.

(21) Appl. No.: 10/037,453

(22) Filed: Dec. 20, 2001

(65) Prior Publication Data

US 2003/0118098 A1 Jun. 26, 2003

(51) Int. Cl.
*H04N 7/12* (2006.01)
*H04N 11/02* (2006.01)

(52) U.S. Cl. .................................................. 375/240.2

(58) Field of Classification Search ........... 375/240.03, 375/240.08, 240.16, 240.24; 341/50; 370/468; 348/397.1, 398.1
See application file for complete search history.

(56) References Cited

U.S. PATENT DOCUMENTS

| 5,021,891 | A | 6/1991 | Lee | |
|---|---|---|---|---|
| 5,107,345 | A | 4/1992 | Lee | |
| 5,253,055 | A * | 10/1993 | Civanlar et al. | 375/240.24 |
| 5,416,604 | A | 5/1995 | Park | |
| 5,604,494 | A * | 2/1997 | Murakami et al. | 341/50 |
| 6,181,711 | B1 * | 1/2001 | Zhang et al. | 370/468 |
| 6,263,021 | B1 | 7/2001 | Sethuraman et al. | |
| 6,335,760 | B1 * | 1/2002 | Sato | 348/397.1 |
| 6,501,798 | B1 * | 12/2002 | Sivan | 375/240.12 |
| 6,778,607 | B2 * | 8/2004 | Zaccarin et al. | 375/240.16 |

* cited by examiner

*Primary Examiner*—Gims Philippe
*Assistant Examiner*—Erick Rekstad
(74) *Attorney, Agent, or Firm*—Brinks Hofer Gilson & Lione

(57) ABSTRACT

A single compression engine determines a plurality of discrete cosine transform (DCT) coefficients based on a discrete cosine transform of a plurality of blocks of data. The single compression engine provides first and second DCT-encoded signals. The first DCT-encoded signal uses at most t coefficient bits to represent each of the DCT coefficients. The second DCT-encoded signal uses at most u coefficient bits, where u is less than t, to represent each of the DCT coefficients.

22 Claims, 2 Drawing Sheets

MULTILEVEL DATA COMPRESSION USING A SINGLE COMPRESSION ENGINE

BACKGROUND OF THE INVENTION

1. Field of the Invention

The present invention relates to compression methods and systems.

2. Description of the Related Art

Mathematical transformations are used in compression systems to represent audio data and/or picture data in a more efficient manner. A widely-used mathematical transformation is the Discrete Cosine Transform (DCT). To provide a substantially-identical representation of a 270 Mb/s CCIR (Comite Consultatif International des Radiocommunications) 601 video stream, a calculation accuracy of about 13 bits to 14 bits is required (see Robin et al., Digital Television Fundamentals, McGraw-Hill, pg. 360). Compression of the video stream may be achieved by discarding lesser significant bits or using fewer bits. Thus, the level of compression is directly tied to the number of places of accuracy maintained throughout the process of calculating the DCT.

Previous approaches to compressing a DCT representation include allocating unequal numbers of bits for the transform coefficients. The number of bits allocated to a transform coefficient may be based upon a variance of the transform coefficient. In this way, more bits are allocated to widely-varying coefficients than for lesser-varying coefficients.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Disclosed herein are a method and a system which provide a plurality of levels of compression using a single compression engine. The single compression engine produces a plurality of encoded versions of a set of data, such as audio data and/or video data. Each encoded version has its own data rate. This enables data links of various bandwidths to use the same compression engine at various data rates and quality levels. For example, both a 6 Mb/s data link and a 3 Mb/s data link could be generated using the same audio and/or video compression engine.

Figure 1:
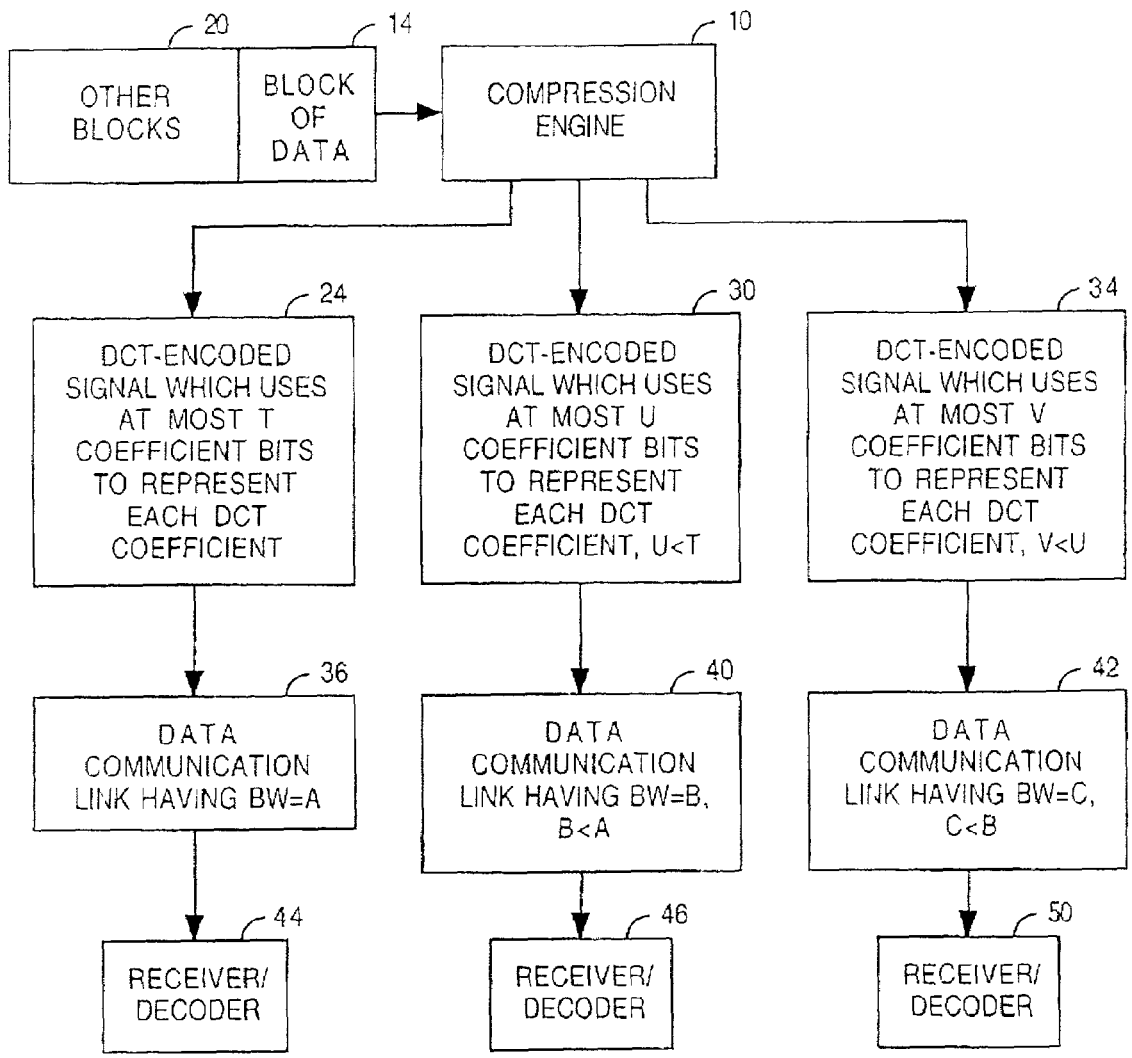
FIG. 1 is a block diagram of an embodiment of a system for providing a plurality of compression levels using a single compression engine.
Figure 2:
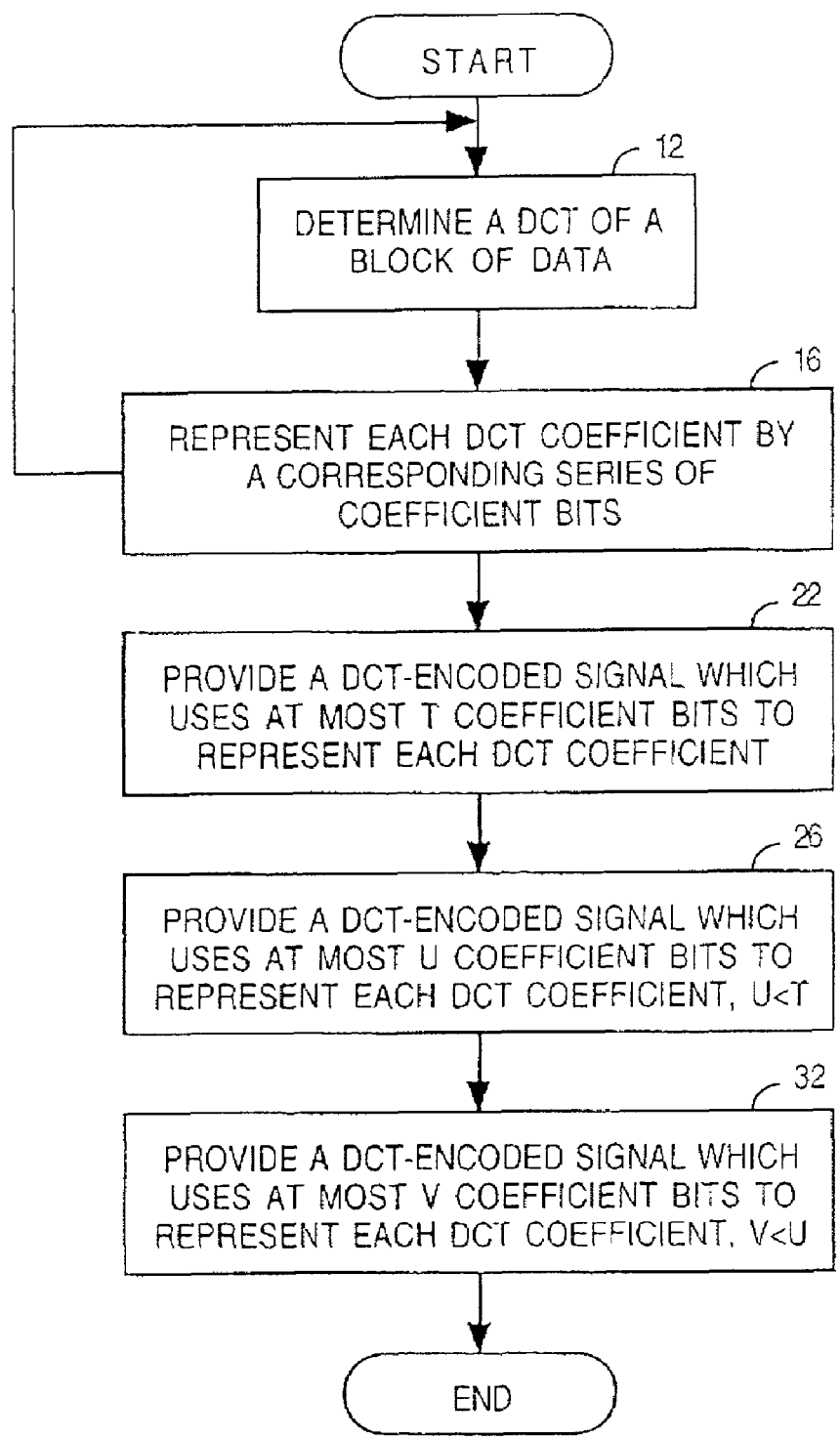
FIG. 2 is a flow chart of an embodiment of a method of providing a plurality of compression levels using a single compression engine.

Embodiments of the present invention are described with reference to FIG. 1, which is a block diagram of an embodiment of a system for providing a plurality of compression levels using a single compression engine 10, and FIG. 2, which is a flow chart of an embodiment of a method of providing a plurality of compression levels using the single compression engine 10. The compression engine 10 may be embodied by a general purpose computer system to perform the acts described herein. The computer system may be directed by computer-readable program code stored by a computer-readable medium. Alternatively, the compression engine 10 may be embodied by an application-specific device.

As indicated by block 12, the method comprises determining a DCT of a block of data 14. For purposes of illustration and example, the block of data 14 comprises an 8-by-8 block of pixels represented by x(i,j), where index values i and j range from 0 to 7. It is noted, however, that the teachings herein also are applicable to blocks of data having widths other than 8-by-8, to data which may not represent video information, and to blocks of data having one dimension or more than two dimensions. A two-dimensional DCT of the block of data can be found using the following formula:

$$Z(k, l) = \frac{1}{4} C_k C_l \sum_{i=0}^{7} \sum_{j=0}^{7} x(i, j) \cos\frac{\pi(2i+1)k}{16} \cos\frac{\pi(2j+1)l}{16}$$

where $Z(k,l)$ represents the DCT coefficient for index values of k and l, $C_k$ and $C_l$ are index-dependent constants, and the index values of k and l range from 0 to 7.

As indicated by block 16, the method comprises representing each DCT coefficient by a corresponding series of t coefficient bits, where t is an integer greater than or equal to zero. The t coefficient bits for a DCT coefficient are represented by $a_1, a_2, \ldots, a_t$. Thus, a DCT coefficient Z is related to its corresponding t coefficient bits as follows:

$$Z = \sum_{m=1}^{t} a_m 2^{n-1-m}$$

where n is a constant selected such that $2^n$ provides a suitable most-significant bit value.

An initial calculation of the DCT coefficients may be performed with t=13 or t=14 so that 13 or 14 bits are used to represent each DCT coefficient. This number is typically set by either a fixed number or an upper bound.

The acts indicated by blocks 12 and 16 can be repeated for other blocks of data 20, e.g. other blocks of pixels in a picture, and/or other blocks of pixels in other pictures in a video sequence.

As indicated by block 22, the method comprises providing a first DCT-encoded signal 24 which uses at most t coefficient bits to represent each DCT coefficient. The first DCT-encoded signal 24 may comprise a bit stream or other form of signal which encodes the at most t coefficient bits to represent each DCT coefficient. Optionally, each DCT coefficient is represented by t coefficient bits.

As indicated by block 26, the method comprises providing a second DCT-encoded signal 30 which uses fewer than t coefficient bits to represent each DCT coefficient. The maximum number of coefficient bits to represent each DCT coefficient in the second DCT-encoded signal 30 is denoted by u. The number of bits/coefficient may be reduced by removing at least one lesser-significant bit from each of the DCT coefficients represented by t coefficient bits. Alternatively, the number of bits/coefficient may be reduced by removing at least one lesser-significant bit from each of the DCT coefficients. The second DCT-encoded signal 30 may comprise a bit stream or other form of signal which encodes the at most u coefficient bits to represent each DCT coefficient.

Optionally, one or more additional DCT-encoded signals are provided which use fewer than t coefficient bits to represent each DCT coefficient. For example, as indicated by block 32, the method may comprise providing a third DCT-encoded signal 34 which uses fewer than u coefficient bits to represent each DCT coefficient. The maximum number of coefficient bits to represent each DCT coefficient in the third DCT-encoded signal 34 is denoted by v. The number of bits/coefficient may be reduced by removing at least two lesser-significant bits from each of the DCT coefficients represented by t coefficient bits. Alternatively, the number of bits/coefficient may be reduced by removing at least two lesser-significant bits from each of the DCT coefficients.

Each DCT-encoded signal may be provided to a corresponding data communication link. For example, the first DCT-encoded signal 24 is provided to a first data communication link 36 having a first bandwidth A, the second DCT-encoded signal 30 is provided to a second data communication link 40 having a second bandwidth B, and the third DCT-encoded signal 34 is provided to a third data communication link 42 having a third bandwidth C. The first bandwidth A is greater than the second bandwidth B, and the second bandwidth B is greater than the third bandwidth C.

Preferably, the DCT-encoded signals 24, 30 and 34 are concurrently communicated via the data communication links 36, 40 and 42, respectively. Optionally, the DCT-encoded signals 24, 30 and 34 are substantially synchronized to provide a substantially similar (other than the level of compression and the data rate) broadcast to recipients thereof.

As stated above, a greater number of coefficient bits produces less compression. By selecting the number of coefficient bits to be sent, a level of compression can be determined. For example, a network distribution center may need the full bandwidth provided by the first DCT-encoded signal 24 which results from an upper bound of coefficient bits of 13 or 14. The network distribution center communicates the first DCT-encoded signal 24 via the data communication link 36 having a high bandwidth. The compression engine 10 may further supply separate data streams having fewer coefficient bits in order to fit the streams in data links of different capacity. For example, one user may choose the data communication link 42 having a very low bit rate to communicate the third DCT-encoded signal 34. Another user may have access to the data communication link 40 having a higher bandwidth, thus enabling a higher quality bit rate version such as the second DCT-encoded signal 30 to be communicated. In general, each customer can individually choose the compression level that fits its technical and/or economic situation.

The DCT-encoded signals 24, 30 and 34 are received and decoded by receiver/decoders 44, 46 and 50, respectively. The present application contemplates each of the receiver/decoders 44, 46 and 50 comprising a decompression engine capable of decompressing DCT-encoded signals at different numbers of bits/coefficient and multiple transmission rates. Use of compression-decompression (codecs) devices capable of working at multiple transmission rates using the same algorithm eliminates multiple codecs for multiple services, which reduces both cost and network complexity.

As video networks move from specialized overlay networks to more general data networks, issues such as maintaining end-user-to-end-user compatibility will remain of interest from both a legacy compatibility perspective and an economic perspective. It is believed that the techniques described herein will aid in the transition by providing a single compression method that can deliver multiple levels of compression over data networks.

It will be apparent to those skilled in the art that the disclosed inventions may be modified in numerous ways and may assume many embodiments other than the preferred forms specifically set out and described herein. For example, the teachings herein can be extended to other transforms used in transform coding. Further, the herein-described base-2 representation of the coefficients may be modified to other base values, e.g. base-10 or base-16. In these cases, the $a_m$ values may assume values other than 0 and 1, e.g. 0 to 9 for base-10 and 0 to F for base-16.

Accordingly, it is intended by the appended claims to cover all modifications which fall within the true spirit and scope of the present invention.

What is claimed is:

1. A method comprising:
   determining a plurality of discrete cosine transform (DCT) coefficients based on a discrete cosine transform of a plurality of blocks of data;
   providing a first DCT-encoded signal which uses at most t coefficient bits to represent each of the DCT coefficients; and
   providing a second DCT-encoded signal which uses at most u coefficient bits, wherein u is less than t, to represent each of the DCT coefficients by removing at least one lesser-significant bit from each of the DCT coefficients having t coefficient bits
   wherein a single compression engine provides the first and second DCT-encoded signals at substantially the same time.

2. The method of claim 1 further comprising:
   providing a third DCT-encoded signal which uses at most v coefficient bits to represent each of the DCT coefficients by removing at least two lesser-significant bits from each of the DCT coefficients having t coefficient bits;
   wherein v is less than u.

3. The method of claim 1 wherein the first DCT-encoded signal uses t coefficient bits to represent each of the DCT coefficients, and wherein the second DCT-encoded signal uses u coefficient bits to represent each of the DCT coefficients.

4. The method of claim 1 wherein the first DCT-encoded signal is provided to a first data communication link having a first bandwidth, wherein the second DCT-encoded signal is provided to a second data communication link having a second bandwidth, and wherein the first bandwidth is greater than the second bandwidth.

5. The method of claim 1 wherein the first DCT-encoded signal has a first data rate, wherein the second DCT-encoded signal has a second data rate, and wherein the first data rate is greater than the second data rate.

6. The method of claim 1 wherein the first DCT-encoded signal and the second DCT-encoded signal are substantially synchronized.

7. The method of claim 1 wherein t is equal to 13 or 14.

8. A computer-usable medium having computer program code to direct a computer system to perform acts of:
   determining a plurality of discrete cosine transform (DCT) coefficients based on a discrete cosine transform of a plurality of blocks of data;

providing a first DCT-encoded signal which uses at most t coefficient bits to represent each of the DCT coefficients; and providing a second DCT-encoded signal which uses at most u coefficient bits, wherein u is less than t, to represent each of the DCT coefficients by removing at least one lesser-significant bit from each of the DCT coefficients having t coefficient bits;

wherein a single compression engine provides the first and second DCT-encoded signals at substantially the same time.

9. The computer-usable medium of claim 8 wherein the computer program code further is to direct the computer system to perform an act of:

providing a third DCT-encoded signal which uses at most v coefficient bits to represent each of the DCT coefficients;

wherein v is less than u.

10. The computer-usable medium of claim 8 wherein the first DCT-encoded signal uses t coefficient bits to represent each of the DCT coefficients, and wherein the second DCT-encoded signal uses u coefficient bits to represent each of the DCT coefficients.

11. The computer-usable medium of claim 8 wherein the first DCT-encoded signal is provided to a first data communication link having a first bandwidth, wherein the second DCT-encoded signal is provided to a second data communication link having a second bandwidth, and wherein the first bandwidth is greater than the second bandwidth.

12. The computer-usable medium of claim 8 wherein the first DCT-encoded signal has a first data rate, wherein the second DCT-encoded signal has a second data rate, and wherein the first data rate is greater than the second data rate.

13. The computer-usable medium of claim 8 wherein the first DCT-encoded signal and the second DCT-encoded signal are substantially synchronized.

14. The computer-usable medium of claim 8 wherein t is equal to 13 or 14.

15. A system comprising:

a single compression engine to determine a plurality of discrete cosine transform (DCT) coefficients based on a discrete cosine transform of a plurality of blocks of data, to provide a first DCT-encoded signal which uses at most t coefficient bits to represent each of the DCT coefficients, and to provide a second DCT-encoded signal which uses at most u coefficient bits, wherein u is less than t, to represent each of the DCT coefficients by removing at least one lesser-significant bit from each of the DCT coefficients having t coefficient bits, and wherein the single compression engine provides the first and second DCT-encoded signals at substantially the same time.

16. The system of claim 15 wherein the compression engine further is to provide a third DCT-encoded signal which uses at most v coefficient bits to represent each of the DCT coefficients, wherein v is less than u.

17. The system of claim 15 wherein the first DCT-encoded signal uses t coefficient bits to represent each of the DCT coefficients, and wherein the second DCT-encoded signal uses u coefficient bits to represent each of the DCT coefficients.

18. The system of claim 15 wherein the first DCT-encoded signal is provided to a first data communication link having a first bandwidth, wherein the second DCT-encoded signal is provided to a second data communication link having a second bandwidth, and wherein the first bandwidth is greater than the second bandwidth.

19. The system of claim 15 wherein the first DCT-encoded signal has a first data rate, wherein the second DCT-encoded signal has a second data rate, and wherein the first data rate is greater than the second data rate.

20. The system of claim 15 wherein the first DCT-encoded signal and the second DCT-encoded signal are substantially synchronized.

21. The system of claim 15 wherein t is equal to 13 or 14.

22. The system of claim 15 wherein the compression engine is to remove at least one lesser-significant bit from each of the DCT coefficients having t coefficient bits.

* * * * *